(12) United States Patent
Friedberger et al.

(10) Patent No.: US 10,830,736 B2
(45) Date of Patent: Nov. 10, 2020

(54) SENSOR SKIN

(71) Applicant: AIRBUS DEFENCE AND SPACE GMBH, Taufkirchen (DE)

(72) Inventors: Alois Friedberger, Taufkirchen (DE); Andreas Helwig, Taufkirchen (DE); Matthias Buderath, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 31 days.

(21) Appl. No.: 15/610,567

(22) Filed: May 31, 2017

(65) Prior Publication Data

US 2017/0356883 A1 Dec. 14, 2017

(30) Foreign Application Priority Data

Jun. 13, 2016 (EP) .................................... 16174250

(51) Int. Cl.
*G01N 29/04* (2006.01)
*G01N 29/24* (2006.01)
(Continued)

(52) U.S. Cl.
CPC .............. *G01N 29/04* (2013.01); *B32B 5/10* (2013.01); *B32B 27/06* (2013.01); *B32B 27/281* (2013.01);
(Continued)

(58) Field of Classification Search
CPC .............. G01N 29/04; G01N 29/2406; G01N 29/2437; G01N 29/043; G01N 2291/106;
(Continued)

(56) References Cited

U.S. PATENT DOCUMENTS

2002/0087083 A1* 7/2002 Nix .......................... A61B 8/12
600/459
2007/0013269 A1* 1/2007 Huang .................. B06B 1/0292
310/334
(Continued)

OTHER PUBLICATIONS

German Search Report for Application No. 16174250 dated Dec. 1, 2016.
(Continued)

*Primary Examiner* — Suman K Nath
(74) *Attorney, Agent, or Firm* — Jenkins, Wilson, Taylor & Hunt, P.A.

(57) ABSTRACT

The disclosure herein relates to a measuring system for determining damage to components including at least one fiber-reinforced plastics material, comprising sensors that can be or are arranged on a component to be mutually spaced, the sensors distributed over a curved surface of the component in the use position. In order provide a measuring system by which it is possible to obtain fiber-reinforced plastics components economically and with reasonable outlay, and by which process parameters and/or state variables can be reliably obtained during production and operation of the component, it is proposed to provide the component with a substrate that is different from the component and on which the sensors can be or are arranged, the substrate being flexible, and for the sensors arranged on the flexible substrate to form a measuring device.

12 Claims, 1 Drawing Sheet

(51) Int. Cl.
*B32B 5/10* (2006.01)
*B32B 27/06* (2006.01)
*B32B 27/28* (2006.01)

(52) U.S. Cl.
CPC ......... *B32B 27/286* (2013.01); *G01N 29/043* (2013.01); *G01N 29/2406* (2013.01); *G01N 29/2437* (2013.01); *B32B 2307/20* (2013.01); *B32B 2379/08* (2013.01); *B32B 2457/00* (2013.01); *G01N 2291/0231* (2013.01); *G01N 2291/0235* (2013.01); *G01N 2291/0289* (2013.01); *G01N 2291/106* (2013.01); *G01N 2291/2694* (2013.01)

(58) Field of Classification Search
CPC ... G01N 2291/0231; G01N 2291/0235; G01N 2291/0289; G01N 2291/2694; G01N 29/323; G01N 29/36; G01N 29/262; B32B 5/10; B32B 27/06; B32B 27/281; B32B 27/286; B32B 2379/08; B32B 2457/00; B32B 2307/20; H01L 41/22
USPC ..................... 73/632, 587; 310/311; 600/535
See application file for complete search history.

(56) References Cited

U.S. PATENT DOCUMENTS

| 2009/0301197 | A1  | 12/2009 | De Smet |
| 2012/0088120 | A1* | 4/2012  | Fujisawa ................. B32B 15/08 428/626 |
| 2014/0047924 | A1  | 2/2014  | Safai |
| 2015/0078136 | A1  | 3/2015  | Sun et al. |
| 2015/0367586 | A1  | 12/2015 | Georgeson et al. |
| 2017/0104143 | A1* | 4/2017  | Palaniswamy ............ B32B 7/12 |

OTHER PUBLICATIONS

Wang, et al., "A Flexible Ultrasound Transducer Array with Micro-Machined Bulk PZT," Sensors, vol. 15, No. 2, pp. 2538-2547, XP055320581, DOI: 10.3390/s150202538, dated Jan. 23, 2015.

Zhuang, et al., "Fabrication of Flexible Transducer Arrays With Through-Wafer Electrical Interconnects Based on Trench Refilling With PDMS," Journal of Microelectromechanical Systems, vol. 17, No. 2, pp. 446-452, XP055320586, US, ISSN: 1057-7157, DOI: 10.1109/JMEMS.2008.918381, dated Apr. 1, 2008.

* cited by examiner

SENSOR SKIN

CROSS-REFERENCE TO RELATED APPLICATION

This application claims priority to European Patent Application EP 16 174 250.7 filed Jun. 13, 2016, the entire disclosure of which is incorporated by reference herein.

TECHNICAL FIELD

The disclosure herein relates to a measuring system for determining damage to components consisting of or comprising at least one fiber-reinforced plastics material, comprising a plurality of sensors that can be or are arranged on a component so as to be mutually spaced, the sensors being distributed over a curved surface of the component in the use position.

BACKGROUND

Measuring systems of which the sensors can be applied to a component made of fiber-reinforced plastics material are known in principle. In order to be able to use a measuring system to assess, for example, future damage to such components reliably and at a reasonable spatial resolution, the corresponding number of sensors must be arranged on the corresponding surface, which requires significant outlay. If, in addition, it is desirable to make statements about the production process of the component, as well as disturbance factors occurring during operation thereof, on the basis of sensor measurements, the above-mentioned outlay may even be multiplied. The outlay required for the associated metrological devices, for example for signal processing, also increases to the same extent.

SUMMARY

An object of the present disclosure is therefore that of providing a measuring system by which it is possible to obtain fiber-reinforced plastics components economically and with reasonable outlay, and by which process parameters and/or state variables can be reliably obtained during production and/or operation of the component, and by which the influence of possible damaging events on the structural integrity of the component during operation can be monitored.

This object is achieved by the features disclosed herein. The solution accordingly consists in or comprises providing the component with a substrate that is different from the component and on which the sensors can be or are arranged, the substrate being flexible, and sensors arranged on the flexible substrate form a measuring device. Therefore, in the disclosure herein, a measuring device in the form of a plurality of sensors is arranged on a flexible substrate, for example a film, and already integrated in the component during production. The component is thus essentially provided with an additional ability, specifically that of the component basically itself monitoring process parameters during its production and the influence of possible damaging events on its structural integrity during operation, with reasonable outlay and in an economical and reliable manner, such that the corresponding data are in principle available at any time. In the process, the flexible substrate provided with the sensors forms a kind of sensor skin. In this case, the curvature of the surface forming the sensor skin is to be understood in the Gaussian sense, such that, in an extreme case, a surface having a vanishing Gaussian curvature forms a subgroup of a torso, specifically a plane.

In an advantageous embodiment of the measuring system according to the disclosure herein that particularly reliably arranges the substrate on the component, the flexible substrate (22) can form a material-uniting connection with the matrix of the component during production of the component (5).

In an advantageous embodiment, the sensor skin and the flexible substrate can be arranged on a surface of the component. Alternatively, the skin can also be integrated into the inside of the matrix during a joining process of the component in question, by a material-uniting connection of two structural elements, such that the sensors can also obtain values from inside the component.

In advantageous developments, the measuring device and the sensors thereof can be provided to monitor the production process, occurrence of damage during operation of the component, or both processes, such that values can potentially be obtained from the formation of the component up to an occurrence of damage, on the basis of corresponding state variables as a measure.

In another embodiment, in the measuring system according to the disclosure herein, the plurality of sensors of the measuring device can be formed as an ultrasonic transducer, such that these sensors make available a large number of established measuring methods for identifying a structural change to the component in question. In the context of this application, the term "sensor" is understood both in its literal meaning and in the sense of a sensor-actuator arrangement, i.e. a transducer, by which a signal can be received as well as generated. In the case of transducers of this kind, various conversion principles are thus also available, by which, in the case of an ultrasonic measuring method, acoustic signals can be converted into electrical signals, specifically, for example, the electrostatic, piezoelectric or piezoresistive conversion principle. However, transducers having conversion principles that are different therefrom are also conceivable.

Advantageous developments of the measuring system can comprise ultrasonic transducers in the form of micromachined capacitive ultrasonic transducers or in the form of a piezoelectric thin film. In this case, capacitive micromachined ultrasonic transducers (CMUT) are micromachined structures that can be used to generate and to receive acoustic signals in the ultrasound range. High-quality, miniaturised ultrasonic transmitters/receivers can be formed thereby that can be easily integrated into CMOS circuits and are resistant to high temperatures. Using thin films that are to be applied by a deposition process also allows for the targeted use of materials intended for piezoelectricity when manufacturing miniaturised systems having both sensory and acoustic properties.

Furthermore, it can be advantageous for some of the sensors to be formed as temperature sensors, such that damage can also be monitored on the basis of temperature measurements, for example in the form of a resistance temperature measurement that is made by a four-wire measuring technique. Optionally, the measurements can thus be monitored by other kinds of sensors.

It is furthermore conceivable to use what is known as a "system on chip" approach when using ultrasound sensors to detect delamination on the component in question, in which approach logic elements and/or micromachined structures are combined in one or more chips at a location of the sensor or at a point on the sensor film that is connected to the component to be monitored, such that mechanical and electrical information can already be processed locally immediately after being produced/measured.

Advantageously, in a preferred development of the measuring system according to the disclosure herein, delamination on the component in question can be detected using ultrasound by a pulse-echo method that is easy to control and provides reliable results. In this method, a time delay of a signal is measured for example, possible delamination that has occurred in the structure of the component reducing this time delay. It is also possible for the change in amplitude to be measured instead. Other methods, for example using Lamb waves, are also possible.

Another expedient embodiment of the measuring system may provide for the ultrasonic measurements of the measuring device to be made using capacitive ultrasonic transducers as an alternative to piezoelectric sensors. Thus, for example, capacitive sensors can be used to monitor the production of fiber-reinforced plastics components in a resin transfer moulding process. In another preferred variant, for example capacitive micromachined ultrasonic transducers (CMUT) can be used as micromachined structures for generating and for receiving acoustic signals in the ultrasound range. The transducers also permit miniaturisation and integration in a highly integrated circuit which can in turn be advantageously integrated in the sensor skin, i.e. in the flexible substrate. Moreover, CMUTs are advantageous in terms of the short response times, reasonable production costs and low manufacturing tolerances thereof. The capacitive approach is above all advantageous for production and operating conditions at high temperatures.

In order to be able to reliably detect, for example, delamination as damage to the structure of the component in an order of magnitude of one inch or 1 cm diameter using the measuring device according to the disclosure herein, the measuring device is provided on the flexible substrate, in both planar extension directions thereof, by a matrix of sensors that are in each case evenly spaced in the directions, in particular so as to have identical spacing in both directions, such that a sufficiently high density of sensors can be achieved. In this case, the sensor density can particularly preferably be approximately in the order of magnitude of expected damage, in the form of delamination for example. However, other spacings that do not necessarily need to be uniform in any dimensions are also conceivable.

In order to prevent increased outlay for cabling and the arrangement of further metrological devices in the surroundings of the component provided with the measuring system, an expedient development of the measuring system can consist in applying conductive tracks, multiplexers or other electronic devices to the flexible substrate and integrating them therein. This means that the majority of the signal chain of the signals generated at the corresponding measurements is generated, received and processed on the sensor skin itself and is merely supplied and/or conducted away by cables connected to the sensor skin. In addition to the sensors/transducers, for example multiplexers, a signal processing unit and what is known as an analogue front-end can be arranged on the flexible substrate by circuit integration, it being possible for the analogue front-end to contain, for example, transmitters, receivers, amplifiers and filters as well as digitisers. Overall, therefore, the majority of the signal processing equipment is thus already integrated in the substrate connected to the component.

In order to be able to achieve reliable integration of the substrate into the matrix of the fiber-reinforced plastics component, in another embodiment of the measuring system the substrate can form a sensor film and can be produced from a thermoplastic high-performance polymer. As a result, the substrate in question on the component can already be connected to the component matrix during production thereof. This is generally a material-uniting joining method in which, optionally using an adhesive agent such as a glue, the relevant structures are interconnected, the structure of the substrate generally being solvated under the effect of heat, resulting in effective binding to the polymer matrix of the component that cures under the same effect of heat.

In particular, the flexible substrate can be connected to the component by a co-bonding or co-curing process. This means that the material-uniting connection between the flexible substrate and the component matrix preferably occurs either by co-bonding or co-curing, i.e. in each case by a method in which at least one of the joining partners is not yet cured, with the result that a reliable structural connection between the substrate and the component matrix is achieved at low tolerances. In a process of this kind, the flexible substrate can also be integrated between the structural elements when a plurality of structural elements are joined to form an overall component.

Reliable arrangement on the component in question is achieved by a flexible substrate, in which thermoplastic high-performance polymer is made of a polyimide, in particular polyetherimide, or a polysulfone, in particular polyethersulfone. The substances each form suitable film materials that reliably bind to the polymer matrix of the component in the respective production processes. If the flexible substrate is integrated in the component in the form of a film using a co-bonding method, the glue used here can be matched so as to bring about impedance matching for an ultrasonic measurement, i.e. matching of the acoustic impedance difference between the different solids, so that an improved signal to noise ratio can be achieved thereby.

In order to be able to easily protect the structures applied to the flexible substrate from their surroundings, the substrate and the structures arranged thereon are provided with at least one additionally arranged layer, in particular a mechanical and/or electrically insulating layer.

If, in a preferred embodiment, LCP (liquid crystal polymer) is used as the flexible substrate and/or for the applied layers, an increased service life can be assumed since, for example, the moisture absorption is very low and it is also possible to assume high dimensional stability even at high temperatures.

The above-mentioned object is also achieved by using a sensor arrangement on a curved surface of a fiber-reinforced plastics component, the sensor arrangement being formed of a thermoplastic high-performance polymer on a flexible substrate, which polymer is connected to the matrix of the component during production of the component.

If the service life of the electronic components integrated on the sensor film is reduced too much and/or if the electronic components are damaged by the high temperature prevailing during the CFRP component manufacture, the components can also be applied and/or changed retrospectively. This can be simplified in an advantageous variant of the use in that interposers are provided on which the electronic chips can be pinned. As a result, the spacings of the contact members can be handled more flexibly, resulting in a more robust manufacturing process.

Accordingly, by the disclosure herein, a film having a high density of sensors and integrated electronic functionality, which film is integrated in a component to be monitored, can both monitor a process for producing fiber-reinforced plastics parts, and detect damage during operation. As a result, the same system can be used for process monitoring and for damage detection, substantially no cabling outlay whatsoever being required on account of integrated electronics, and the use of an established method (pulse-echo method) allowing simple signal evaluation and damage localisation.

The measuring system according to the disclosure herein also permits self-monitoring of components, which self-monitoring replaces checks and increases maintenance intervals or may make the intervals obsolete at certain points. Use in the fields of retrofitting/repair in maintenance in particular of parts for aviation and aerospace is also conceivable.

The embodiments and developments above can, where appropriate, be combined with one another as desired. In particular, in this case a combination of different sensors on a sensor skin would be conceivable in order to increase the reliability of the measurements. Use of different sensor skins, for example arranged one behind the other having alternating sensors on a large surface would also be conceivable.

Further possible embodiments, developments and implementations of the disclosure herein also include combinations not explicitly mentioned of features of the disclosure herein which are described above or in the following in relation to the embodiments.

In particular, in this case, a person skilled in the art will also add individual aspects as improvements or additions to the relevant basic form of the present disclosure.

BRIEF DESCRIPTION OF THE DRAWINGS

The disclosure herein is explained in greater detail in the following, on the basis of embodiments shown in the example drawings. In the drawings, in a schematic representation in part.

DETAILED DESCRIPTION

Figure 1:
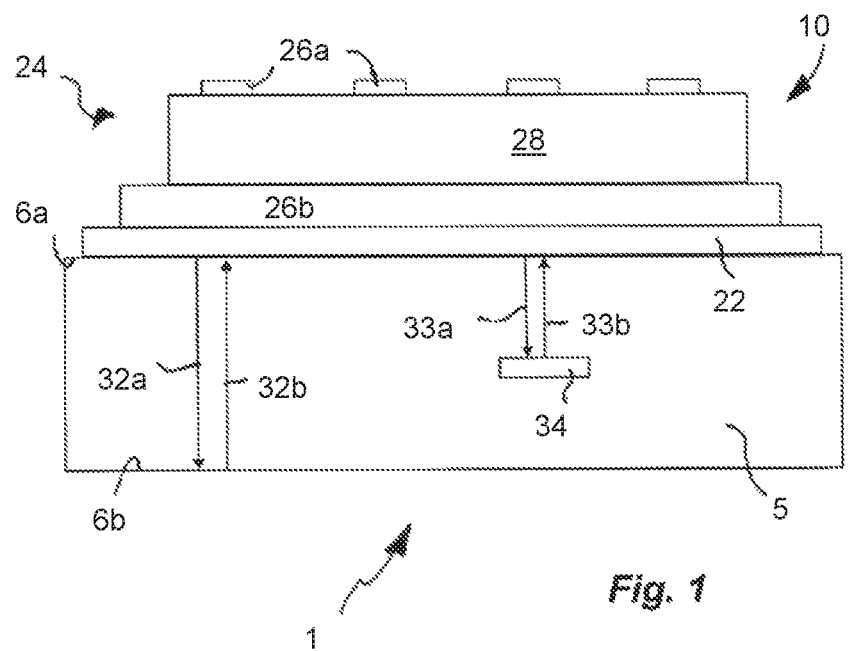
FIG. 1 is a sectional side view of a measuring system comprising a sensor skin as a flexible substrate on a CFRP component comprising piezo sensors.

In all the figures, like or functionally like elements and apparatuses have been provided with the same reference numerals unless specified otherwise.

FIG. 1 first shows a measuring system, denoted as a whole by 1, for determining damage to a component 5 made of a fiber-reinforced plastics material. A film made of a flexible substrate 22 is arranged as a sensor skin on the side of the component 5 that is the top for the viewer. The sensor skin is provided with a plurality of sensors 24 that form a measuring device on the substrate 22. In this case, the sensors 24 are formed by transducers arranged on the flexible polyetherimide substrate 22. The transducers in turn consist of or comprise two opposing electrodes 26A, 26B, between which a piezoelectric ceramic film 28 is arranged.

This arrangement of transducers as sensors 24 forms the sensor skin on the flexible substrate 22, which skin is arranged on a surface of the component 5. The sensors 24 carry out a pulse-echo method on the component 5 in order to detect damage, which method is shown by the ultrasound waves moving back and forth between two opposing lateral surfaces 6a, 6b of the component 5, which waves are indicated by arrows 32b, 32b, 33a, 33b. Sound waves 32a, 32b moving back and forth and unimpeded between the lateral surfaces 6a, 6b can be seen in the left-hand region of FIG. 1, whereas the delay time thereof is reduced in the right-hand region in that the sound waves 33a, 33b encounter delamination 34 on their way through the plastics component 5 and are already reflected there.

Figure 2:
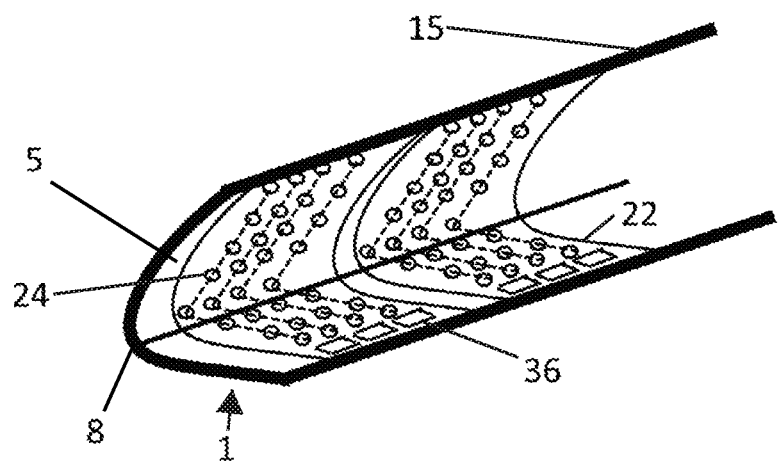
FIG. 2 is a perspective side view of an arrangement of a sensor skin comprising electronic components on the parabolic profile of a leading edge of an airfoil.

The fact that the signal processing is also already carried out for the most part on the sensor skin is due to electronic devices 36 that can be applied to and integrated in the flexible substrate 22, as can be seen in FIG. 2. This shows the leading edge 8 of a portion of an airfoil 15 of an aircraft. The inner face of the parabolic profile of the airfoil 15 is provided with a plurality of sensor skins. In the present case, it can be seen in each case that the sensor skins form a curved surface on the inner face of the profile of the airfoil 15. In turn, sensors 24 arranged uniformly over each surface can be seen on the sensor skin, which sensors can make ultrasound measurements on the glass-reinforced component 5.

The permanent connection between the sensor skins and the component 5 achieved during the preceding production process ensures uninterrupted monitoring of the structural integrity of the component 5 in question and the associated signal processing.

Accordingly, the disclosure herein described above thus relates to a measuring system 1 for determining damage to a component 5 consisting of or comprising at least one fiber-reinforced plastics material, comprising a plurality of sensors 24 that can be or are arranged on a component 5 so as to be mutually spaced, the sensors 24 being distributed over a curved surface of the component 5 in the use position.

In order provide a measuring system 1 by which it is possible to obtain fiber-reinforced plastics components 5 economically and with reasonable outlay, and by which process parameters and/or state variables can be reliably obtained during production and operation of the component 5, the component 5 is provided with a substrate 22 that is different from the component and on which the sensors 24 can be or are arranged, the substrate 22 being flexible, and the sensors 24 arranged on the flexible substrate 22 form a measuring device. In a preferred development, the flexible substrate 22 also forms a material-uniting connection with the matrix of the component 5 during production of the component.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 1 measuring system
5 fiber-reinforced component
6a, 6b lateral surfaces of the component
8 airfoil leading edge
15 airfoil 22 flexible substrate
24 sensor/transducer
26a, 26b electrodes
28 piezoelectric ceramic film
32a, 32b arrows
33a, 33b arrows
34 delamination
36 electrical devices

The invention claimed is:

1. A system for measuring damage to a fiber-reinforced plastics component, the system comprising:
    a flexible substrate attached on the fiber-reinforced plastics component, the flexible substrate being in a form of a film made from a thermoplastic high-performance polymer that forms a material-uniting connection with a matrix of the fiber-reinforced plastics component when the fiber-reinforced plastics component is cured;
    one or more interposer structures on the flexible substrate before the fiber-reinforced plastics component is cured;
    a plurality of sensors attached to the interposer structures after the fiber-reinforced plastics component has been cured to form a sensor arrangement such that the interposer structures are equipped with the plurality of sensors only after the fiber-reinforced plastics component has been cured;
    wherein the sensors are in a form of one or more electronic chips and the interposer structures are configured such that the one or more electronic chips are pinned thereon and the interposer structures protect the sensors from high temperature;
    wherein the plurality of sensors, placed on the flexible substrate, are distributed over a curved surface of the fiber-reinforced plastics component, to which the flexible substrate is attached, in a use position,
    wherein the plurality of sensors on the flexible substrate form a measuring device.

2. The system of claim 1, wherein the measuring device is configured to monitor production of the component and/or operation of the component by the plurality of sensors.

3. The system of claim 1, wherein the plurality of sensors of the measuring device is formed on the flexible substrate as an ultrasonic transducer.

4. The system of claim 3, wherein the ultrasonic transducer is formed as a micromachined capacitive ultrasonic transducer or as a piezoelectric thin film.

5. The system of claim 1, wherein the measuring device is configured to perform a pulse-echo method.

6. The system of claim 1, wherein the measuring device is configured to perform a capacitive measurement by the sensors.

7. The system of claim 1, wherein the measuring device forms, on the substrate in both planar extension directions thereof, a matrix of sensors that are evenly spaced in both planar extension directions, in particular sensors having identical spacing in the directions.

8. The system of claim 1, wherein conductive tracks, multiplexers, or other electronic devices are applied to and integrated in the flexible substrate.

9. The system of claim 1, wherein the flexible substrate can be or is connected to the component by a co-bonding or co-curing process.

10. The system of claim 1, wherein the thermoplastic high-performance polymer is made of at least one of a polyimide, polyetherimide, a polysulfone, or a polyethersulfone.

11. A method of measuring damage to a fiber-reinforced plastics component having a curved surface, the method comprising:
    attaching a flexible substrate on the fiber-reinforced plastics component, the flexible substrate being in a form of a film made from a thermoplastic high-performance polymer that forms a material-uniting connection with a matrix of the fiber-reinforced plastics component when the fiber-reinforced plastics component is cured;
    arranging one or more interposer structures on the flexible substrate before the fiber-reinforced plastics component is cured;
    attaching a plurality of sensors to the interposer structures after the fiber-reinforced plastics component has been cured to form a sensor arrangement, such that the interposer structures are equipped with the plurality of sensors only after the fiber-reinforced plastics component has been cured;
    wherein the sensors are in a form of one or more electronic chips and the interposer structures are configured such that the one or more electronic chips are pinned thereon and the interposer structures protect the sensors from high temperature;
    monitoring production of the fiber-reinforced plastics component; and
    detecting damage to the fiber-reinforced plastics component during operation thereof.

12. The system of claim 1, wherein the flexible substrate is formed as liquid-crystal polymer (LCP).

* * * * *